(12) United States Patent
Matsuura (10) Patent No.: US 7,161,892 B2
(45) Date of Patent: Jan. 9, 2007

(54) OPTICAL RECORDING MEDIUM AND OPTICAL INFORMATION PROCESSOR

(75) Inventor: Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 10/504,514

(22) PCT Filed: Mar. 14, 2002

(86) PCT No.: PCT/JP02/02449

§ 371 (c)(1),
(2), (4) Date: Aug. 13, 2004

(87) PCT Pub. No.: WO03/077241

PCT Pub. Date: Sep. 18, 2003

(65) Prior Publication Data

US 2005/0128929 A1    Jun. 16, 2005

(51) Int. Cl.
*G11B 7/24* (2006.01)

(52) U.S. Cl. ................ 369/275.3; 369/275.4; 369/44.29

(58) Field of Classification Search ............ 369/275.3, 369/275.4, 275.5
See application file for complete search history.

(56) References Cited

U.S. PATENT DOCUMENTS

| | | | | |
|---|---|---|---|---|
| 6,282,163 B1 * | 8/2001 | Fujiwara | ................ | 369/59.2 |
| 6,301,208 B1 * | 10/2001 | Sugaya et al. | ............ | 369/47.1 |
| 6,434,096 B1 * | 8/2002 | Akagi et al. | ............ | 369/44.32 |
| 6,885,620 B1 * | 4/2005 | Turner et al. | ............ | 369/53.12 |

FOREIGN PATENT DOCUMENTS

| | | |
|---|---|---|
| JP | 11-025461 | 1/1999 |
| JP | 2000-132850 | 5/2000 |
| JP | 2000-331383 | 11/2000 |
| JP | 2001-014730 | 1/2001 |

* cited by examiner

*Primary Examiner*—Wayne Young
*Assistant Examiner*—Adam R. Giesy
(74) *Attorney, Agent, or Firm*—Greer, Burns & Crain, Ltd.

(57) ABSTRACT

An optical recording medium (D) includes tracks (T) extending along a spiral. The tracks (T) include a plurality of first sections (Ta) and a plurality of second sections (Tb) differing from the first sections with respect to at least one of width and depth. Each of the first sections (Ta) includes a first overlapping portion (11) in which the trailing end and other portion of the first section overlap each other in the tracking direction, the trailing end and the other portion of the first section being located in adjacent tracks. Each of the second sections (Tb) includes a similar configured second overlapping portion (12). Due to such a structure, the beam spot can be easily caused to circulate on the same track of the optical recording medium (D) during idling.

15 Claims, 8 Drawing Sheets

PRIOR ART

FIG. 7

PRIOR ART

OPTICAL RECORDING MEDIUM AND OPTICAL INFORMATION PROCESSOR

TECHNICAL FIELD

The present invention relates to an optical recording medium and an optical information processing apparatus. The term "optical recording medium" as used herein refers to a recording medium whereby data can be recorded and/or reproduced using optical means, and is a general term encompassing not only strictly optical recording medium such as CD-ROM but also recording media whereby data can be rewritten by means of a magneto-optical recording system, phase change system, or the like.

BACKGROUND ART

Figure 7:
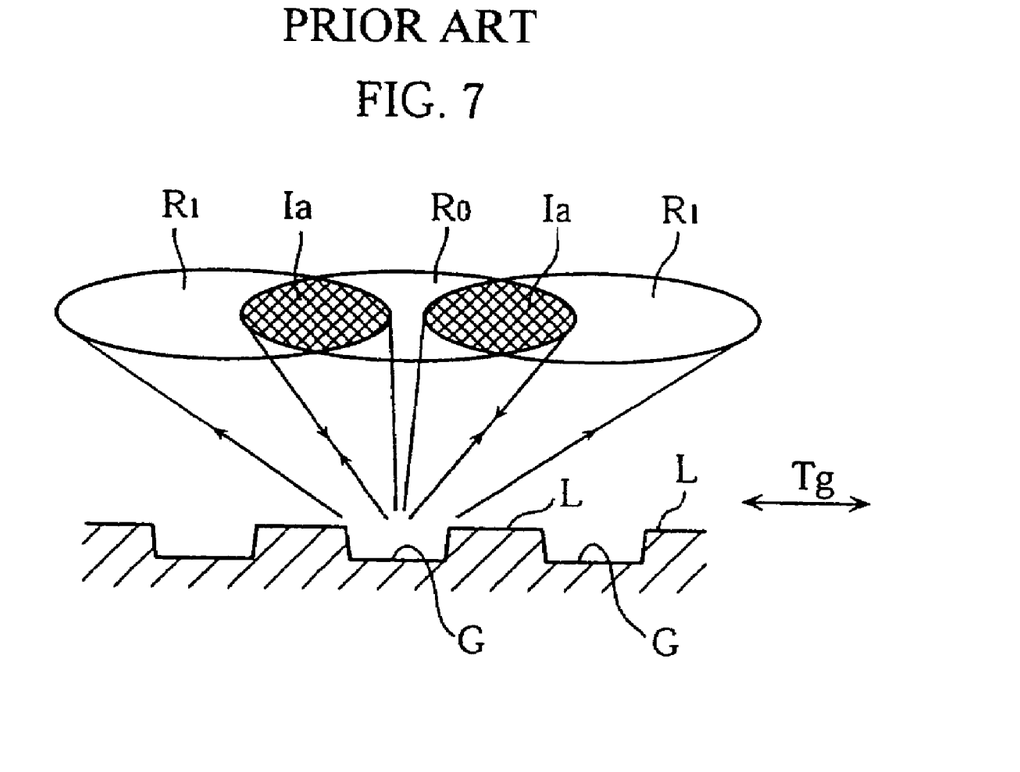
FIG. 7 is a diagram showing interference of light.

An example of an optical disk is shown in FIG. 7. This disk is provided with a recording layer in which lands L and grooves G are formed in an alternating fashion along the tracking direction Tg (radial direction of the optical disk). A push-pull method, for example, is available as a method for performing tracking control in an optical disk device that uses such an optical disk. The interference of light reflected the optical disk is indispensable for understanding the present invention which utilizes this method, and is therefore described below.

Figure 8:
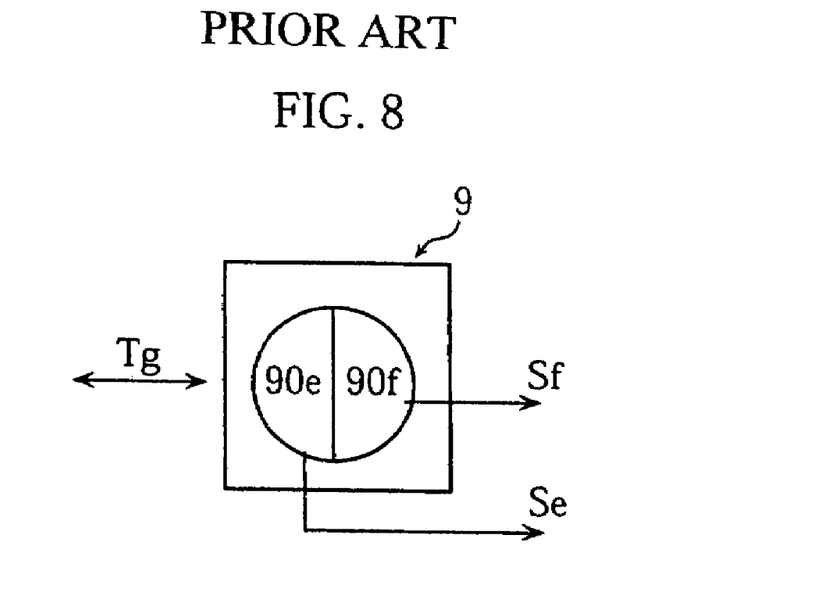
FIG. 8 is a diagram showing the conventional process of generating a tracking error signal.

As shown in the same figure, when a beam of light is projected to the grooves G of the optical disk, the reflected light includes a bundle of zero-order light rays $R_0$ and two bundles of first-order light rays $R_1$ interfering with each other to generate interference light Ia. The zero-order light $R_0$ consists of non-diffracted light that is reflected so as to follow the irradiating path of the light beam toward the grooves G. In contrast, the two bundles of first-order light rays $R_1$ consist of positive and negative first-order diffracted light rays that are generated due to the fact that the lands L and the grooves G are arranged in side-by-side relationship in the tracking direction. When the beam of light is irradiated at a position offset from the center of the groove G in the tracking direction, the two bundles of first-order light rays R1 become asymmetric and the reflected light develops differential intensity in the tracking direction. The reflected light is detected using an optical detector 9 having two light-receiving sections 90e, 90f arranged in the tracking direction Tg, as shown in FIG. 8 for example. Electrical signals Se, Sf each having a level corresponding to the amount of received light (light intensity) by the light-receiving sections 90e, 90f are outputted from the optical detector 9, and a tracking error signal (push-pull signal) is created by taking the difference of the two electrical signals. This tracking error signal represents the direction and amount of the tracking error.

The track pitch need be reduced with a resulting increase of the data recording density in order to increase the data recording capacity of the optical disk. However, as the track pitch is reduced, the interval between the two bundles of first-order light rays $R_1$ widens, so that the proportion of interference light Ia contained in the reflected light reduces. Eventually leads, a so-called diffraction limit is reached in which no interference light Ia is contained in the reflected light. The limit track pitch Pt that causes the diffraction limit is theoretically defined as $Pt=\lambda/NA/2$ (where $\lambda$ is the wavelength of the light beam and NA is the numerical aperture of the objective lens). It becomes difficult to detect a tracking error by the above-mentioned method when the track pitch of the optical disk is smaller than the limit track pitch described above.

Figure 9:
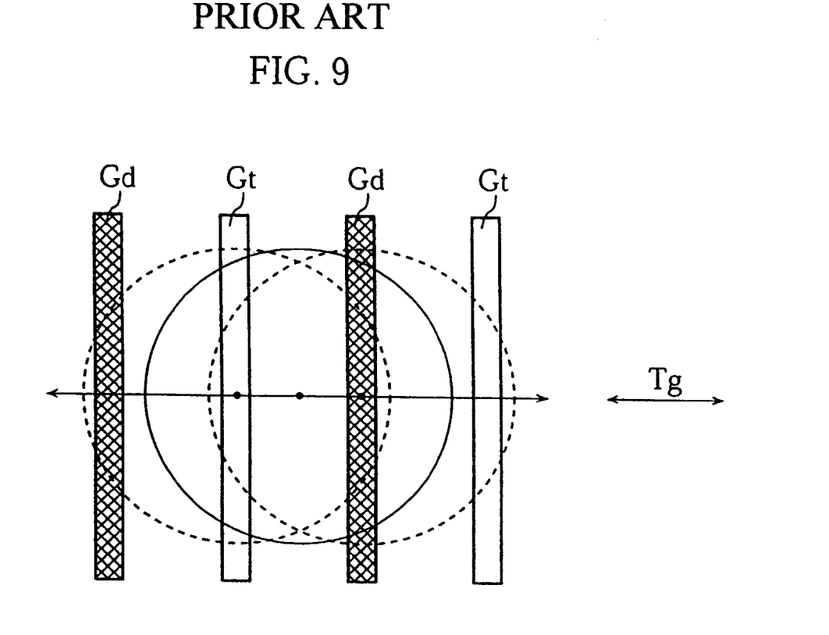
FIG. 9 is a diagram showing the prior art.
Figure 10A:
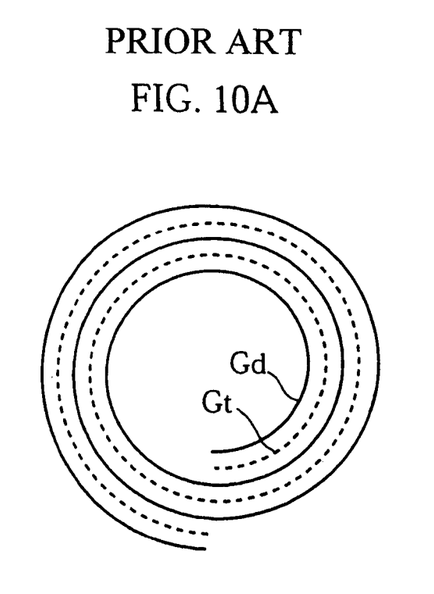
FIG. 10A is a diagram showing the tracks in an exemplary prior art disk.

A conventional counter-measure is disclosed in JP-A 2000-331383. According to the conventional counter-measure, grooves Gd, Gt adjacent to each other in the tracking direction Tg are designed to differ from each other with respect to one or both of the depth and width, as shown in FIG. 9. The grooves Gd, Gt are formed to extend along two co-extensive spirals as shown in FIG. 10A, or to extend along a single spiral in which they are alternately connected to each other as shown in FIG. 10B.

According to this prior art technique, the apparent spatial frequency of the optical disk can be made ½. Consequently, a tracking error can be detected even when the track pitch is made narrower than the limit track pitch established by the equation $Pt=\lambda/NA/2$ above.

However, the prior art technique described above has the following drawbacks. In the former structure shown in FIG. 10A, the two grooves Gd, Gt extend along two parallel spirals, so when data are continuously written in the tracks of the optical disk, for example, processing for writing to the groove Gd and processing for writing to the groove Gt must be alternately performed. The control of continuous writing while changing the writing-target tracks in this manner is not easy, and its implementation is difficult. In order to form the grooves Gd, Gt by a depicting method that uses an electron beam in the manufacture of the optical disk, two electron beams must be used, so the optical disk is also difficult to manufacture.

Figure 10B:
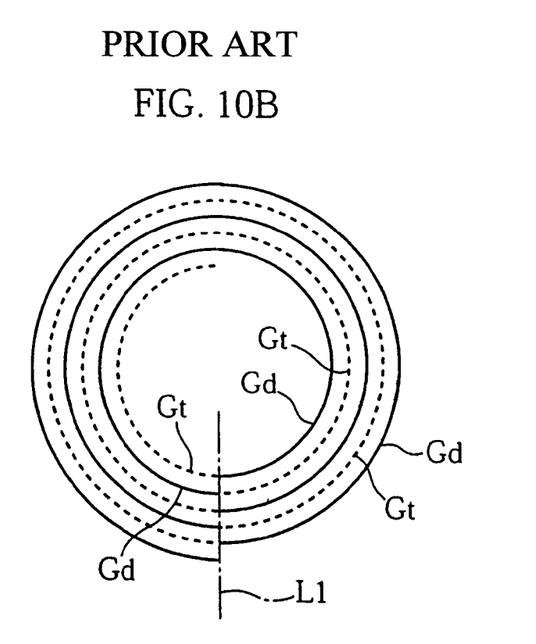
FIG. 10B is a diagram showing the tracks in another exemplary prior art disk.

In contrast, in the latter structure shown in FIG. 10B, the grooves Gd, Gt are formed along a single spiral, so the grooves can be formed using a single electron beam, and the groove forming operation is facilitated. Write processing is also facilitated because there is no need to change the writing-target tracks when data are continuously written in the tracks. However, the latter structure still has the following drawbacks.

Firstly, it is not easy to perform control whereby the optical head is held facing the same track during idle time in which no data are written or read. The reason for this is that because the tracks extend along a spiral, the optical head cannot be held facing the same orbital track solely by performing tracking control on the basis of the tracking error signal obtained by the above-described method, and control for track jumps, referred to as "track jumping", must be performed.

Secondly, both grooves Gd, Gt are equally interrupted at the borderline indicated by the line L1 shown in FIG. 10B. Therefore, a sudden change occurs whereby the polarity of the tracking error signal obtained at that time is reversed when the beam of light continues to irradiate the section near the changeover point. Consequently, when the optical head attempts to find the number of traversed tracks by counting the number of zero points in the tracking error signal during a seek operation for moving the optical head to a position opposite the target track, counting errors can easily occur due to erroneous counting of the sudden change in the tracking error signal described above.

Thirdly, the sensitivity with which the tracking error is detected is by no means high, and it is difficult to perform highly accurate tracking control on the basis of the tracking error signal. This third drawback is also encountered in the former structure shown in FIG. 10A.

DISCLOSURE OF THE INVENTION

It is an object of the present invention to provide an optical recording medium and an optical information processing apparatus that are capable of overcoming or alleviating the foregoing drawbacks.

According to a first aspect of the present invention, there is provided an optical recording medium comprising:

a recording layer having a surface which is indented in cross section extending in a tracking direction, said surface being formed with tracks extending along a spiral;

the tracks including a plurality of first sections and a plurality of second sections, the first sections differing from the second sections with respect to at least one of width and depth, the first sections alternating with the second sections in a manner such that a trailing end of one section is connected to a leading end of another section;

a first overlapping portion in which the trailing end and another portion of each first section overlap each other in the tracking direction, said trailing end and said another portion of said each first section being located in adjacent tracks; and a second overlapping portion in which the trailing end and another portion of each second section overlap each other in the tracking direction, said trailing end and said another portion of said each second section being located in adjacent tracks.

Preferably, the recording layer comprises grooves and lands alternating with the grooves in the tracking direction.

Preferably, the optical recording medium is a groove-recording disk for writing data in the grooves.

Preferably, the optical recording medium is a read-only disk wherein the tracks are formed with a plurality of pits for data.

Preferably, at least one shift point between the first section and the second section is provided in every turn of the tracks.

Preferably, the optical recording medium further comprises a plurality of gaps for creating a thickness wise height difference in the tracks, and the gaps positioned in each track are offset from the gaps positioned in an adjacent track in the track direction.

Preferably, the gaps are formed by spacing the grooves from each other in the track direction.

Preferably, the gaps are arranged at a constant pitch at least in a same track.

Preferably, the amount of the offset in the track direction between the gaps in adjacent tracks is set at 1/N (where N is an integer of no less than 2) of the gap pitch in one of the tracks.

According to a second aspect of the present invention, there is provided an optical information processing apparatus comprising:

an optical head disposed in facing relationship to an optical recording medium for emitting a beam of light to the optical recording medium and for receiving the light reflected from the optical recording medium;

an optical detector for receiving the reflected light from the optical recording medium via the optical head to output a signal corresponding to an intensity distribution of the reflected light; and a push-pull signal generator for generating a radial push-pull signal and a tangential push-pull signal in dependence on an intensity difference of the reflected light in a tracking direction and in a track direction on the basis of the signal outputted from the optical detector;

a first signal processor for generating a first tracking error signal by removing a noise component from the radial push-pull signal;

a second signal processor for generating a second tracking error signal by sampling and holding the radial push-pull signal when a predetermined change has occurred in the tangential push-pull signal; and a controller for performing tracking control on the basis of the first tracking error signal during idle time in which data are neither written in nor read from the optical recording medium while performing tracking control on the basis of the second tracking error signal when data are written or read.

Preferably, the first signal processor is a filter for removing a high-frequency component of no less than a predetermined minimum frequency.

Preferably, the optical information processing apparatus further comprises a track counter for counting the tracks during a seek operation by detecting and counting zero points of the first tracking error signal.

Preferably, the second signal processor comprises a detection circuit for detecting amplitude and zero point of the tangential push-pull signal, and a sample hold circuit for sampling the radial push-pull signal when a predetermined amplitude and the zero point are detected by the detection circuit.

Preferably, the optical information processing apparatus further comprises a clock signal generator for generating a clock signal in synchronization with a timing at which the zero point is detected by the detection circuit.

Other features and advantages of the present invention will become clearer from the following description of embodiments of the invention.

BEST MODE FOR CARRYING OUT THE INVENTION

Preferred embodiments of the present invention will be described in detail hereinafter with reference to the drawings.

Figure 1:
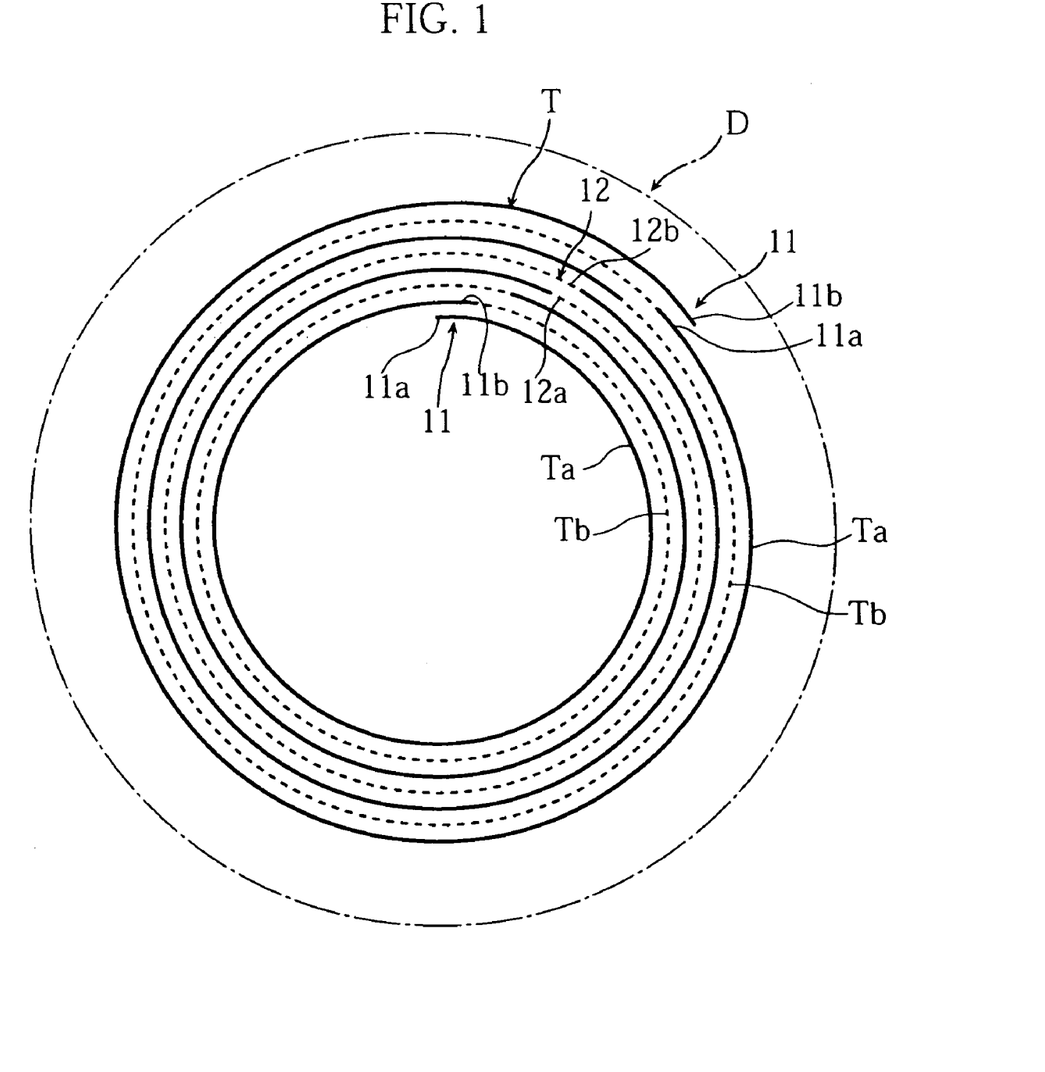
FIG. 1 is a schematic plan view showing an example of a magneto-optical disk to which the present invention is applied.
Figure 2:
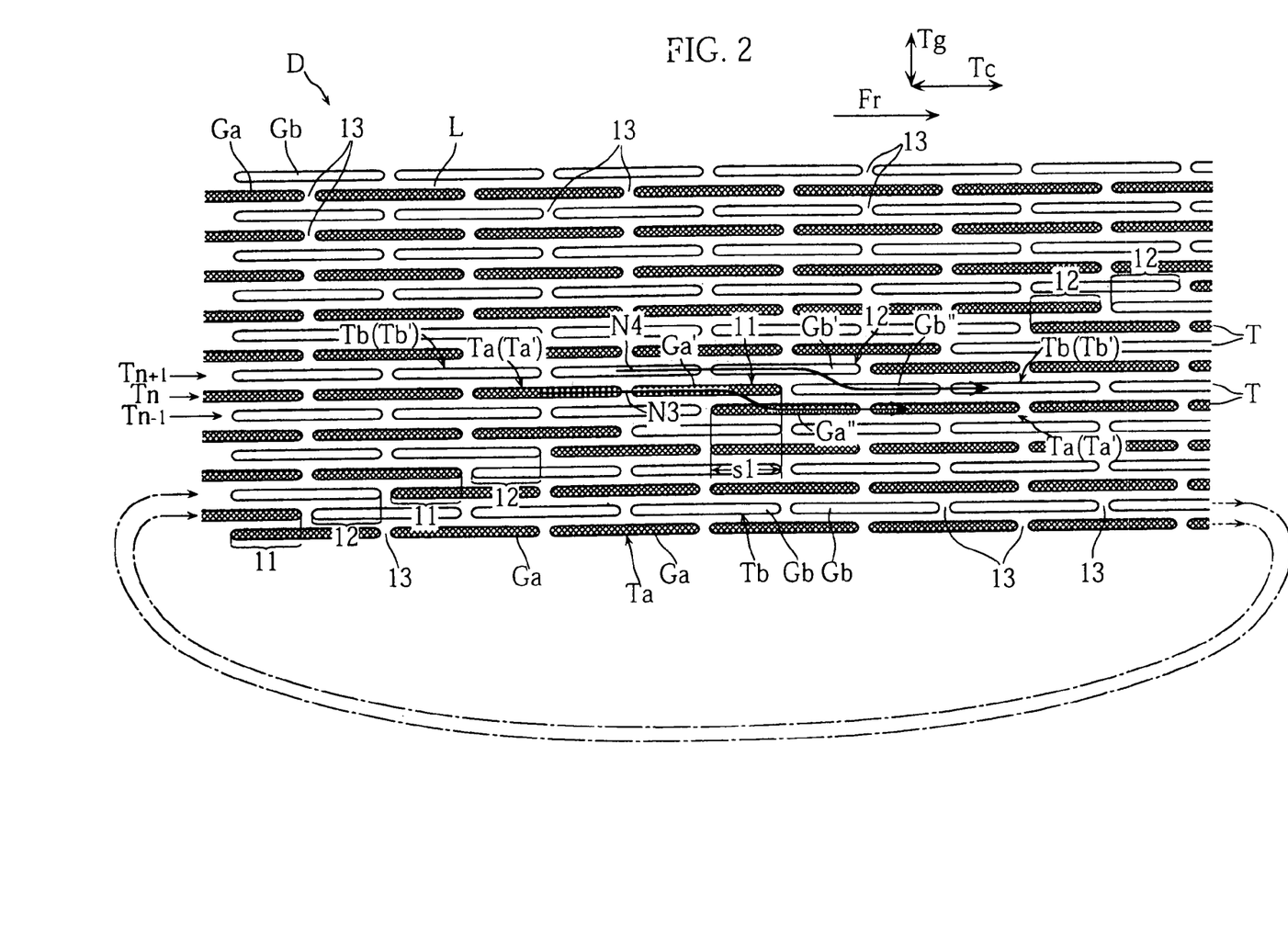
FIG. 2 is a plan view illustrating the main structure of the magneto-optical disk in FIG. 1.

FIGS. 1 and 2 show an example of a magneto-optical disk to which the present invention is applied. The magneto-optical disk D of the present embodiment is a groove-recording disk in which lands and grooves are formed in the recording layer, and only the grooves are used as tracks for data recording.

As shown in FIG. 1, the tracks T formed in the recording layer of the magneto-optical disk D extends along a single spiral. The tracks T include a plurality of first sections Ta (indicated by solid lines) and a plurality of second sections Tb (indicated by dashed lines).

As shown in FIG. 2, each of the first sections Ta is a section in which a plurality of first grooves Ga (portions marked with crosshatching) are formed along the track direction Tc. Each of the second sections Tb is a section in which a plurality of second grooves Gb are formed along the track direction Tc. The first and second grooves Ga, Gb have the same width in the tracking direction Tg, but have different depths. In the present invention, the first and second grooves Ga, Gb may have the same depth but different widths in the tracking direction Tg, or may differ in both depth and width in the tracking direction Tg.

Each of the first and second sections Ta, Tb is made slightly longer than the length of turn of the track T. This results in the formation of a plurality of first overlapping portions 11 in each of which the leading end 11a and trailing end 11b of a respective first section Ta overlap in the track direction Tc, and a plurality of second overlapping portions 12 in each of which the leading end 12a and trailing end 12b of a respective second sections Tb overlap in the track direction Tc, as shown in FIG. 1.

Referring to FIG. 2, a more specific description is given by taking the first section Ta (Ta') extending from the (n−1)th track $T_{n-1}$ to the nth track $T_n$ for example. The first grooves Ga', Ga" corresponding to the trailing end and leading end, respectively, of the first section Ta (Ta') are positioned in adjacent tracks and overlap each other in the track direction Tc by an appropriate amount s1 (the direction indicated by the arrow Fr is the direction in which the optical head moves relative to the magneto-optical disk D). In any other one of the first sections Ta, similarly, the first grooves Ga at the trailing and leading ends are positioned in adjacent tracks at other locations and partially overlap each other in the track direction Tc.

The second sections Tb are configured in the same manner. Taking, as an example, the second section Tb (Tb') extending from the nth track $T_n$ to the (n+1)th track $T_{n+1}$, the second grooves Gb', Gb" corresponding to the trailing end and leading end, respectively, are positioned in adjacent tracks and overlap each other in the track direction Tc. The first and second overlapping portions 11 and 12 alternate with each other at every turn of the tracks T, and either one of the first or second overlapping portions 11 or 12 is present in every turn of the tracks T.

The first and second grooves Ga, Gb have the same length at least in the same track T and are arranged at a constant pitch. Portions of the tracks T between the grooves are gaps 13 having the same height as the lands L. The gaps 13 are provided in an orderly manner, as described below.

Figure 3:
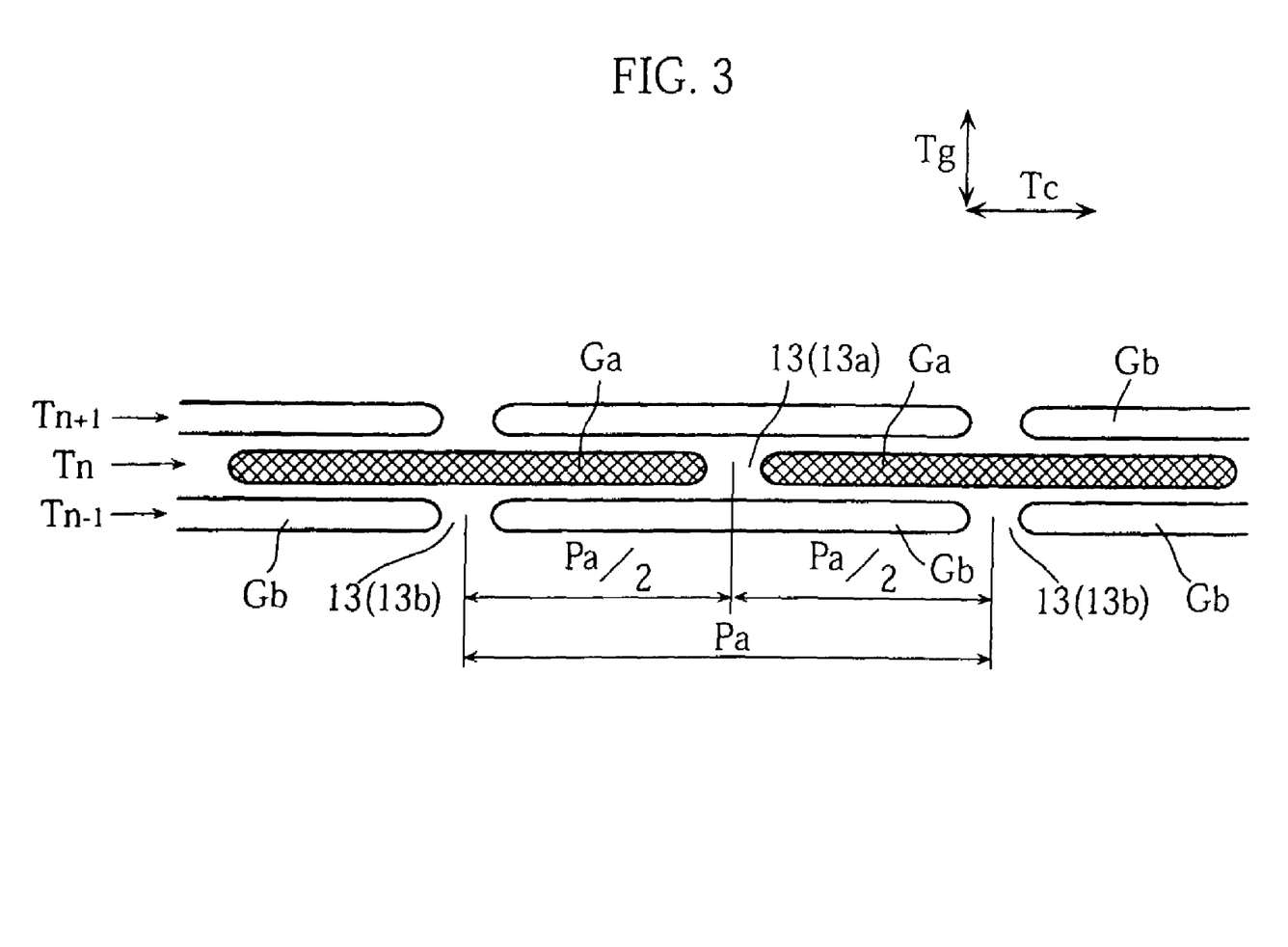
FIG. 3 is a diagram showing the relationship between the gaps and grooves of the magneto-optical disk illustrated in FIG. 1.

As shown in FIG. 3, the gaps 13 (13a) in the nth track Tn are offset from the gaps 13 (13b) in the preceding (n−1)th track $T_{n-1}$ in the track direction Tc by ½ the pitch Pa between the preceding track gaps. In this way, the gaps 13 between each two adjacent tracks T in the magneto-optical disk D are thus offset by ½ the arrangement pitch of the gaps 13 in the track T. Consequently, each of the gaps 13 is sandwiched between the first and/or second grooves Ga, Gb in the tracking direction Tg.

Figure 4:
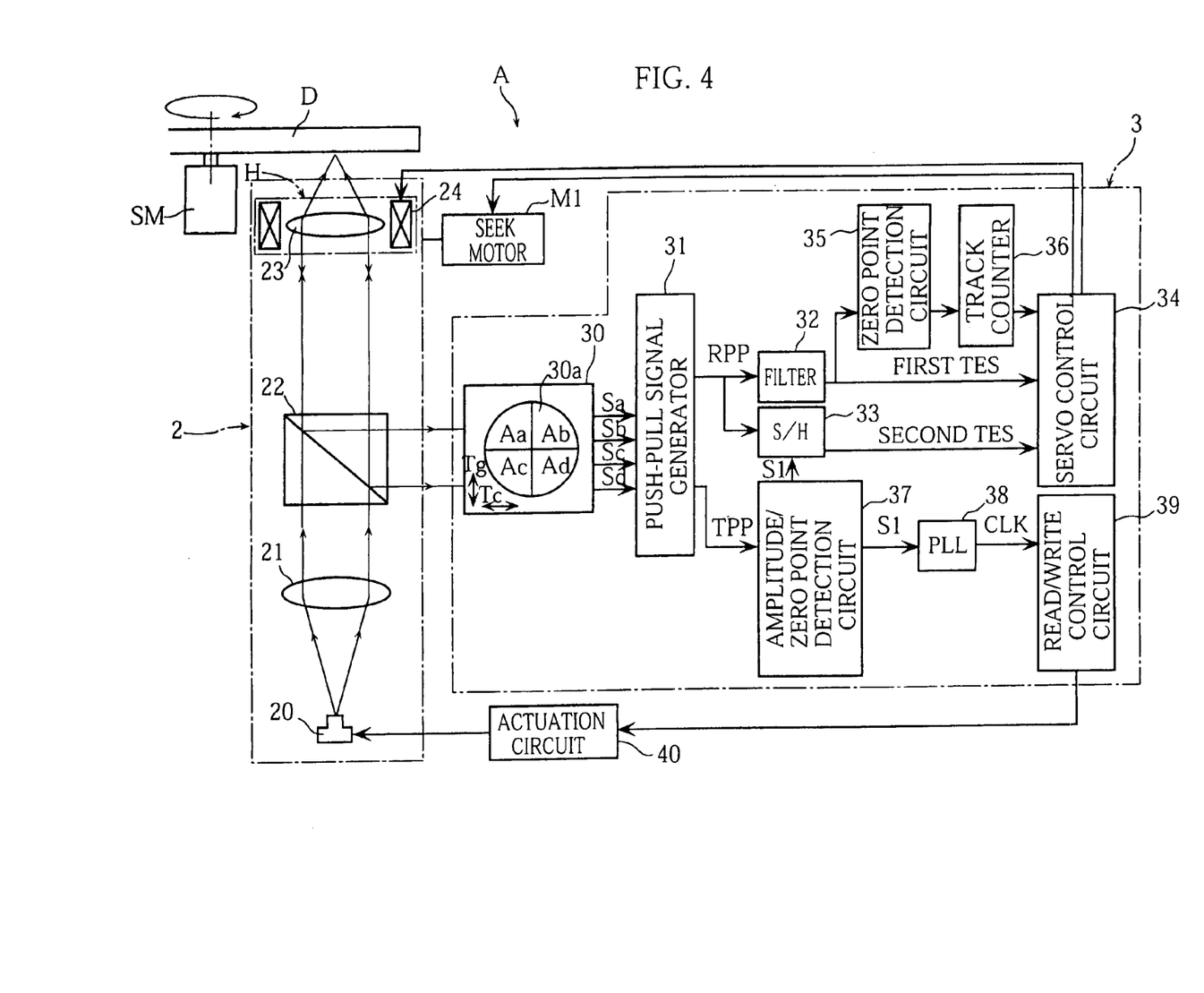
FIG. 4 is a schematic block diagram showing an example of a magneto-optical disk apparatus to which the present invention is applied.

FIG. 4 illustrates an example of a magneto-optical disk device to which the present invention is applied.

The magneto-optical disk device A of the present embodiment includes a spindle motor SM for supporting the magneto-optical disk D described above and rotating it at high speed, an optical unit 2, and a signal generating unit 3.

The optical unit 2 is designed so that laser light emitted from a laser diode 20 is collimated by a collimator lens 21, then passed through a half mirror 22, and caused to enter an objective lens 23 of an optical head H. The laser light incident on the objective lens 23 is focused to form a beam spot on the recording layer of the magneto-optical disk D. The light reflected by the recording layer passes again through the objective lens 23 and is returned to the half mirror 22 where it changes the propagation direction for entering into the signal generating system 3. The optical system 2 is provided with a seek motor M1 for moving the optical head H towards the position that faces the target track of the magneto-optical disk D, and with a tracking control actuator 24 for causing the objective lens 23 to track the target track. Though not shown in the drawings, the optical head H is provided with a coil for generating a magnetic field that acts on the portion in which the beam spot is formed on the magneto-optical disk D.

The signal generating unit 3 has an optical detector 30, a push-pull signal generator 31, a filter 32, a sample hold circuit 33, a servo control circuit 34, and other circuits described hereinafter.

The optical detector 30 includes, for example, a photoelectric conversion element and has a light-receiving surface 30a for receiving reflected light from the magneto-optical disk D. The light-receiving surface 30a is divided into four equal regions Aa~Ad for receiving light divisionally in the tracking direction Tg and in the track direction Tc. The optical detector 30 outputs signals Sa~Sd corresponding to the amount of light (the intensity of light) received in the four regions Aa through Ad.

The push-pull signal generator 31 creates a radial push-pull signal (hereinafter referred to as "RPP signal") and a tangential push-pull signal (hereinafter referred to as "TPP") on the basis of the signals Sa~Sd outputted from the optical detector 30. When the output levels of the signals Sa~Sd are represented as a~d, the level $L_{RPP}$ of the RPP signal satisfies the relation: $L_{RPP}=(a+b)-(c+d)$. The RPP signal is a signal corresponding to the intensity distribution, in the tracking direction Tg, of light reflected from the magneto-optical disk D. In principle, the RPP signal is zero if the tracking is correct.

The level $L_{TPP}$ of the TPP signal satisfies the relation: $L_{TPP}=(a+c)-(b+d)$. The TPP signal corresponds to the intensity distribution, in the track direction Tc, of light reflected from the magneto-optical disk D. Consequently, the TPP signal is zero when the beam spot is formed at the longitudinal center of any one of the first and second grooves Ga, Gb of the magneto-optical disk D. When the beam spot is formed in any gap 13 or in the vicinity thereof, an interference light pattern such as described with reference to FIG. 7 is formed along the track direction Tc, whereby the TPP signal fluctuates.

Figures 5A, 5B, 5C:
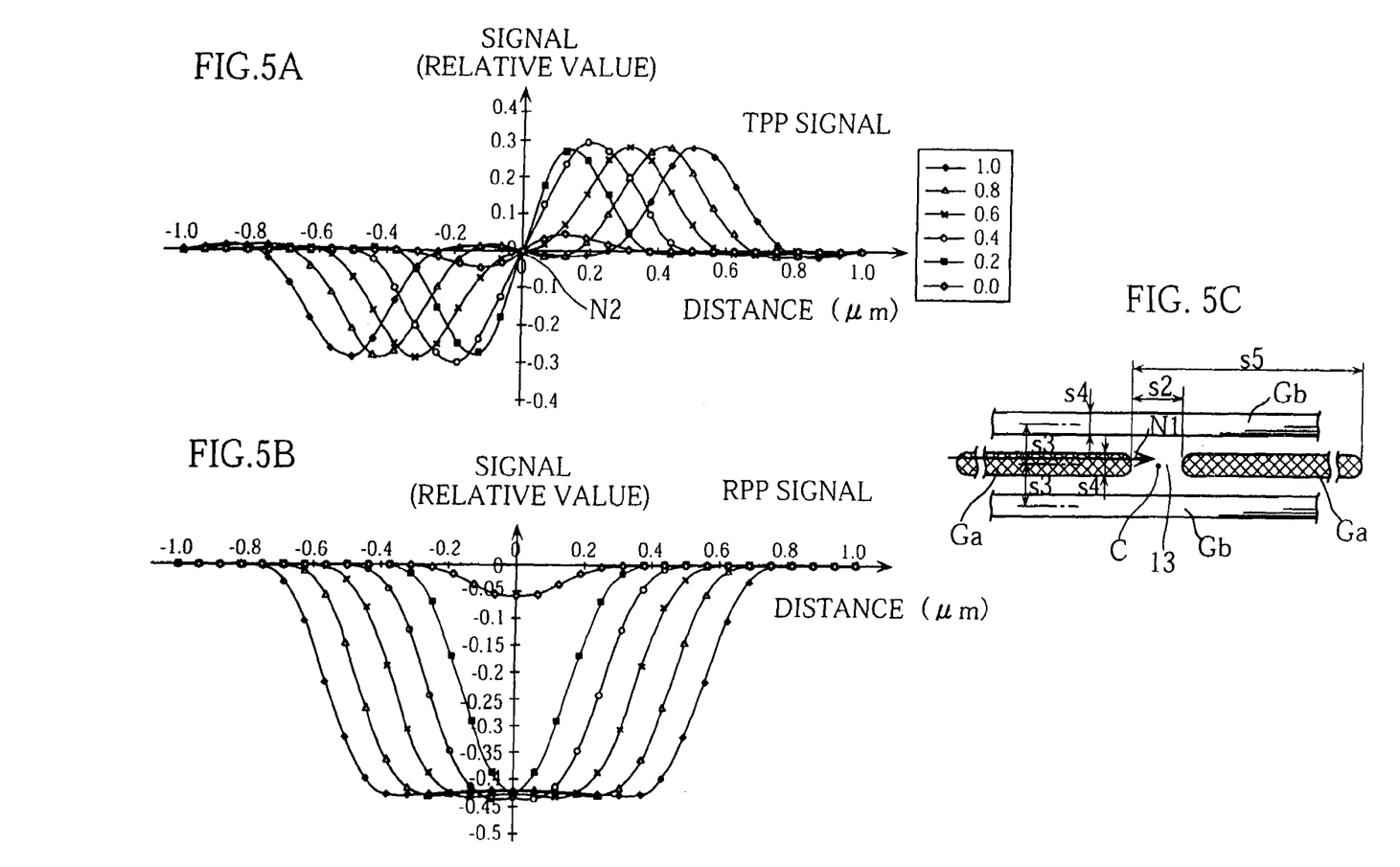
FIG. 5A is a diagram showing a specific example of a TPP signal.
FIG. 5B is a diagram showing a specific example of a RPP signal.
FIG. 5C is a diagram showing the conditions for obtaining the TPP signal and the RPP signal.

FIG. 5A shows a specific example of the waveform of the TPP signal when the beam spot is formed in a gap 13 or in the vicinity thereof. As shown in FIG. 5C, these data show the relation between the distance from the center C of the gap 13 and the output level (relative value) of the TPP signal when the beam spot is formed at that distance in the cases where the width s2 of the gap 13 is set to a plurality of predetermined values. The track-to-track pitch s3 was 0.24

μm; the groove width s4 was 0.16 μm; and the total length s5 of one gap 13 and one first groove Ga was 10 μm. The NA of the optical head H was 0.85, and the wavelength of the laser beam was 405 nm. As is apparent from FIG. 5A, the TPP signal swings to the negative side when the beam spot enters the gap 13, becomes zero when the beam spot reaches the center of the gap 13, swings to the positive side, and then returns to zero.

As shown in FIG. 4, the TPP signal is inputted to an amplitude/zero point detection circuit 37. The amplitude/zero point detection circuit 37 detects the fluctuation of, and the zero point in the fluctuation of, a TPP signal such as described with reference to FIG. 5A, and outputs a predetermined pulse reference signal S1 when the zero point is detected. This reference signal S1 is inputted to the sample hold circuit 33 and the PLL circuit 38. The PLL circuit 38 generates a clock signal CLK on the basis of the reference signal S1, and the clock signal CLK is inputted to a read/write control circuit 39. The clock signal CLK is used as a timing signal for the read/write control circuit 39 in controlling the actuation circuit 40 which drives the laser diode 20.

The RPP signal is inputted to both the filter 32 and the sample hold circuit 33. The filter 32 performs the role of removing the high-frequency noise component from the RPP signal. As already described, the RPP signal is zero if the tracking is correct, but can become mixed with a high-frequency noise component when the beam spot is formed in the gap 13. The filter 32 creates a first tracking error signal from the RPP signal by removing the noise component from the RPP signal. The first tracking error signal corresponds to the tracking error signal in the conventional technique, and is inputted to the servo control circuit 34 and a zero point detection circuit 35.

The zero point detection circuit 35 is a circuit for detecting the zero point of the first tracking error signal, and the number of detections is counted by a track counter 36. During a seek operation, the count number corresponds to the number of tracks T traversed by the optical head H, or to the distance traveled by the optical head H. The count number signal is also inputted to the servo control circuit 34.

The sample hold circuit 33 is a circuit for sampling the RPP signal with the timing at which the zero point is detected in the TPP signal by the amplitude/zero point detection circuit 37, thereby creating a second tracking error signal. This aspect will be described in detail hereinafter.

FIG. 5B shows a specific example of the waveform of the RPP signal. The conditions whereby this RPP signal is obtained are the same as for obtaining the TPP signal shown in FIG. 5A. However, the level of the RPP signal is zero or consists solely of a high-frequency noise component when the beam spot is aligned in the center of the track, so the RPP signal shown in FIG. 5B is the signal obtained when the beam spot is formed in a position that is offset in the tracking direction Tg by an appropriate distance from the track center, as indicated by the arrow N1 in FIG. 5C.

When the zero point indicated by the symbol N2 in FIG. 5A is detected, the sample hold circuit 33 samples an RPP signal such as the one shown in FIG. 5B and outputs the sampled signal. This signal consists of a second tracking error signal. Therefore, this second tracking error signal carries the nuance of a tracking error signal in the center C of the gap 13.

The servo control circuit 34 is configured so as to perform actuation control of the actuator 24 and the seek motor M1 to perform tracking control and seek operation on the basis of the first and second tracking error signals. The servo control circuit 34 is configured so that tracking control is performed on the basis of the second tracking error signal when processing is executed for the writing or reading of data to or from the magneto-optical disk D, but the tracking control is performed on the basis of the first tracking error signal during idle time in which such writing or reading is not executed.

The operation of the magneto-optical disk device A will next be described.

First, tracking control is executed on the basis of a first tracking error signal during idle time. During this idle time, assuming that the beam spot formed on the first section Ta (Ta') of the nth track Tn in FIG. 2, for example, enters the first groove Ga' at the trailing end of the first section Ta (Ta'), the second groove Gb' is present on one side of the first groove Ga' in the tracking direction Tg, whereas the first groove Ga" is present in the opposite side. Thus, the apparent spatial frequency becomes ⅓, and a first tracking error signal can appropriately be obtained at this time as well.

The first tracking error signal obtained at this time is such that it is formed as if the track center is located between the two first grooves Ga' and Ga'. Therefore, if tracking control is performed on the basis of this first tracking error signal, the beam spot shifts from the first groove Ga' to the first groove Ga" for subsequently causing the beam spot to move along the first section Ta (Ta') on the (n−1)th track $T_{n-1}$, as indicated by the arrow N3 in FIG. 2. As a result, the beam spot is caused to circulate only along the first section Ta (Ta') during idling.

A similar function can be obtained in the same manner for the second section Tb as well. For example, a beam spot formed on the second section Tb (Tb') of the (n+1)th track $T_{n+1}$ can be caused to proceed as indicated by the arrow N4 in the second overlapping portion 12 and can be caused to circulate only along the second section Tb (Tb').

Thus, according to the present embodiment, the beam spot can be caused to circulate for facilitation of control simply by performing tracking control on the basis of the first tracking error signal irrespective of the fact that the track T of the magneto-optical disk D has a spiral shape. Either a first or a second overlapping portion 11 or 12 is provided in every turn of the tracks T, so that circulation of the beam spot during idling as described above can be performed in any of the tracks, which is better for smoothly performing the above-mentioned control.

The first tracking error signal can also be prevented from sharply changing in the portion in which the first and second sections Ta and Tb change over, by providing the first and second overlapping portions 11, 12 in the tracks T. Specifically, according to the prior art shown in FIG. 10B, the location at which the first section changes over to the second section in one track is flanked by a point of shift from the second section to the first section in the adjacent tracks. By contrast, the inventive magneto-optical disk D does not have this type of configuration, and a point of shift from the first section Ta to the second section Tb in one track is flanked by two adjacent tracks but an accompanying shift from the second section Tb to the first section Ta only in one of the two tracks. Therefore, the amount of variance in the first tracking error signal according to the present embodiment can be reduced compared to that in the tracking error signal according to the above-described prior art. Consequently, as compared to the prior art, there is a reduced risk of erroneously counting a sudden change in the tracking error signal as a track count can be reduced when the track counter 36 counts the number of tracks by counting the number of zero point detections in the first tracking error signal during a seek operation. The present magneto-optical disk device A tends to give a lower count with respect to the number of tracks, but a lower count of tracks provides an easier correction of seek operation than a higher count.

On the other hand, when data are written to or read from the magneto-optical disk D, tracking control is executed on the basis of the second tracking error signal. As previously described, the second tracking error signal is a kind of signal that corresponds to a tracking error signal at the center of the gap 13, and is therefore different from the first tracking error signal in that it is not affected by the first and second overlapping portions 11, 12. Since the plurality of gaps 13 are provided at a constant interval in any turn of the tracks T, the second tracking error signal can be consistently obtained at a constant interval. Consequently, it is possible to perform highly accurate tracking control on the basis of the second tracking error signal, and processing for writing or reading of data can be appropriately performed.

The clock signal CLK used when data are written or read is created on the basis of the plurality of gaps 13, and a correct clock signal CLK can be obtained because the interval between the plurality of gaps 13 is constant at least in the same track. In contrast to the present embodiment, in the case where there is no consistency with respect to the positions of the gaps 13 among the plurality of tracks Ts for example, a mismatch in the phase relation between the PLL and the gaps 13 occurs and resynchronization must be performed when a so-called track shift is performed in a seek operation for example. In the magneto-optical disk D, however, the amount of the positional offset between gaps 13 in two adjacent tracks T is designed to be ½ the pitch Pa of the gaps 13 in one of these two tracks T, as described with reference to FIG. 3. Therefore, if the above-mentioned amount of the positional offset is used as a reference clock interval, mismatch in the phase relation between the PLL and the gaps 13 can be avoided even when a so-called track jump is performed. It is therefore possible to eliminate the need for performing resynchronization every time a so-called track shift is performed. It should be noted that such an advantage is not limited to the case where the amount of the positional offset described above is set to ½ the pitch Pa of the gaps 13, and may also be obtained when the offset is ⅓, ¼, or another fraction of 1 with an integer denominator of 2 or more.

The present invention is not limited by the foregoing embodiment. The specific structure of the optical recording medium and of the components of the optical information processing apparatus according to the present invention is also subject to various design modifications.

Figure 6:
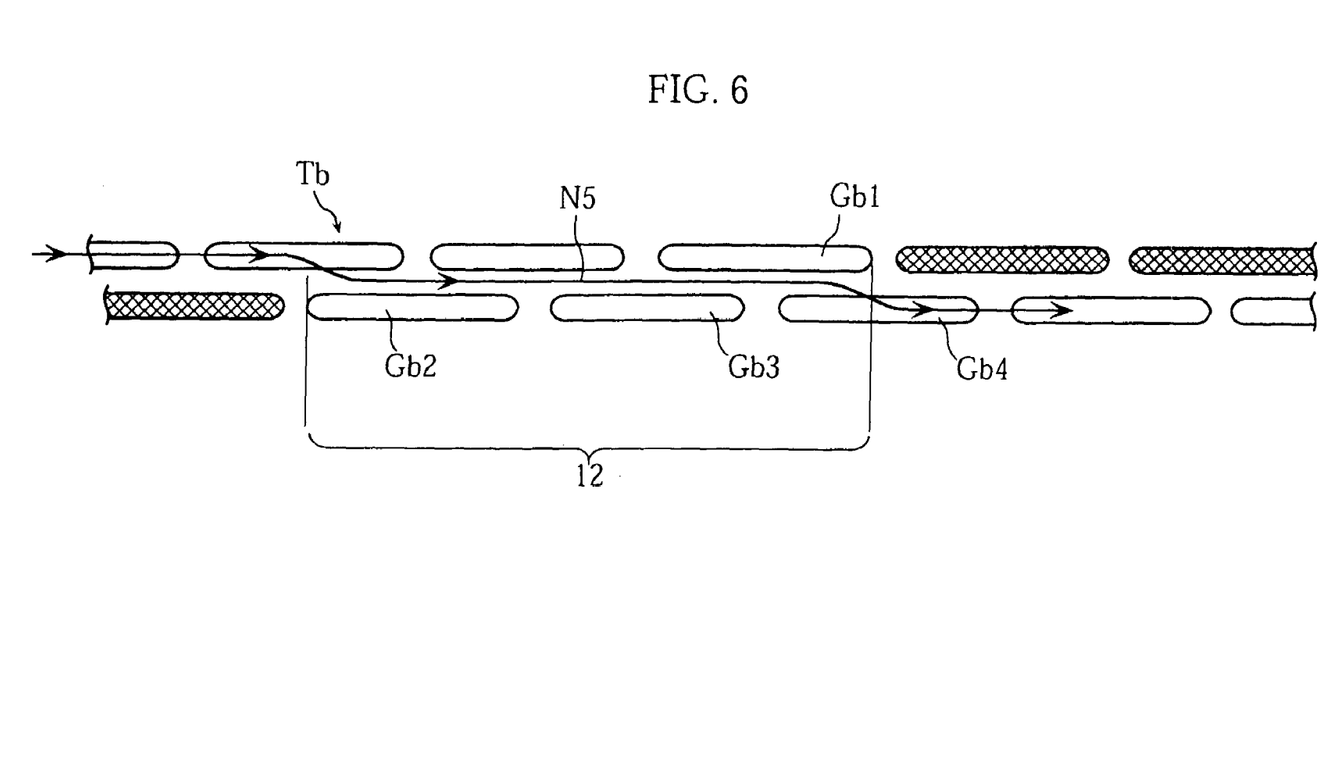
FIG. 6 is a schematic diagram showing another example of the present invention.

FIG. 6 shows another embodiment of the present invention. Each of the second overlapping portions 12 in this embodiment is such that the groove Gb1 at the trailing end of the second section Tb does not overlap the groove Gb2 at the leading end of the second section Tb. Instead, it overlaps other grooves Gb3 and Gb4. The beam spot can be caused to move as indicated by the arrow N5 in the same figure, and the function intended for by the present invention can be obtained in this structure as well. It is apparent from this embodiment that the first and second overlapping portions referred to in the present invention need not be designed such that the trailing ends of the first and second sections overlap the leading ends of the respective sections, and may overlap an intermediate portion instead of the leading end. The specific length of the overlap is also not limited.

The present invention may also be applied to a type of optical recording medium that differs from a groove recording format; for example, a read-only optical disk provided with rows of pits as tracks. It is possible with this read-only optical disk to obtain clock information by forming the beam spot in the pits, and the structure of the signal generating system differs in this respect from the magneto-optical disk device A described above.

The invention claimed is:

1. An optical recording medium comprising:
   a recording layer having a surface which is indented in cross section extending in a tracking direction, said surface being formed with tracks extending along a spiral;
   the tracks including a plurality of first sections and a plurality of second sections, the first sections differing from the second sections with respect to at least one of width and depth, the first sections alternating with the second sections in a manner such that a trailing end of one section is connected to a leading end of another section;
   a first overlapping portion in which the trailing end and another portion of each first section overlap each other in the tracking direction, said trailing end and said another portion of said each first section being located in adjacent tracks; and
   a second overlapping portion in which the trailing end and another portion of each second section overlap each other in the tracking direction, said trailing end and said another portion of said each second section being located in adjacent tracks.

2. The optical recording medium according to claim 1, wherein the recording layer comprises grooves and lands alternating with the grooves in the tracking direction.

3. The optical recording medium according to claim 2, which is a groove-recording disk for writing data in the grooves.

4. The optical recording medium according to claim 1, which is a read-only disk wherein the tracks are formed with a plurality of pits for data.

5. The optical recording medium according to claim 1, wherein at least one shift point between the first section and the second section is provided in every turn of the tracks.

6. The optical recording medium according to claim 2, further comprising a plurality of gaps for creating a thickness wise height difference in the tracks, the gaps positioned in each track being offset from the gaps positioned in an adjacent track in the track direction.

7. The optical recording medium according to claim 6, wherein the gaps are formed by spacing the grooves from each other in the track direction.

8. The optical recording medium according to claim 7, wherein the gaps are arranged at a constant pitch at least in a same track.

9. The optical recording medium according to claim 8, wherein the amount of the offset in the track direction between the gaps in adjacent tracks is set at 1/N (where N is an integer of no less than 2) of the gap pitch in one of the tracks.

10. An optical information processing apparatus comprising:
   an optical head disposed in facing relationship to an optical recording medium for emitting a beam of light to the optical recording medium and for receiving the light reflected from the optical recording medium;
   an optical detector for receiving the reflected light from the optical recording medium via the optical head to output a signal corresponding to an intensity distribution of the reflected light; and a push-pull signal generator for generating a radial push-pull signal and a tangential push-pull signal in dependence on an intensity difference of the reflected light in a tracking direction and in a track direction on the basis of the signal outputted from the optical detector;

a first signal processor for generating a first tracking error signal by removing a noise component from the radial push-pull signal;

a second signal processor for generating a second tracking error signal by sampling and holding the radial push-pull signal only upon detection of a predetermined value of the tangential push-pull signal; and a controller for performing tracking control on the basis of the first tracking error signal during idle time in which data are neither written in nor read from the optical recording medium while performing tracking control on the basis of the second tracking error signal when data are written or read.

11. The optical information processing apparatus according to claim 10, wherein the first signal processor is a filter for removing a high-frequency component of no less than a predetermined minimum frequency.

12. The optical information processing apparatus according to claim 10, further comprising a track counter for counting the tracks during a seek operation by detecting and counting zero points of the first tracking error signal.

13. The optical information processing apparatus according to claim 10, wherein the second signal processor comprises a detection circuit for detecting amplitude and zero point of the tangential push-pull signal; and a sample hold circuit for sampling the radial push-pull signal when a predetermined amplitude and the zero point are detected by the detection circuit.

14. The optical information processing apparatus according to claim 13, further comprising a clock signal generator for generating a clock signal in synchronization with a timing at which the zero point is detected by the detection circuit.

15. An optical information processing apparatus comprising:

an optical head disposed in facing relationship to an optical recording medium for emitting a beam of light to the optical recording medium and for receiving the light reflected from the optical recording medium;

an optical detector for receiving the reflected light from the optical recording medium via the optical head to output a signal corresponding to an intensity distribution of the reflected light; and a push-pull signal generator for generating a radial push-pull signal and a tangential push-pull signal in dependence on an intensity difference of the reflected light in a tracking direction and in a track direction on the basis of the signal outputted from the optical detector;

a first signal processor for generating a first tracking error signal by removing a noise component from the radial push-pull signal;

a second signal processor for generating a second tracking error signal by sampling and holding the radial push-pull signal upon detection of a zero point in the tangential push-pull signal; and a controller for performing tracking control on the basis of the first tracking error signal during idle time in which data are neither written in nor read from the optical recording medium while performing tracking control on the basis of the second tracking error signal when data are written or read.

* * * * *